United States Patent
Mamrak et al.

(10) Patent No.: US 12,441,058 B2
(45) Date of Patent: Oct. 14, 2025

(54) CLOSED LOOP GATED RECOATER MONITORING SYSTEM

(71) Applicant: General Electric Company, Schenectady, NY (US)

(72) Inventors: Justin Mamrak, Loveland, OH (US); MacKenzie Ryan Redding, Mason, OH (US); Zachary David Fieldman, West Chester, OH (US)

(73) Assignee: General Electric Company, Evendale, OH (US)

( * ) Notice: Subject to any disclaimer, the term of this patent is extended or adjusted under 35 U.S.C. 154(b) by 17 days.

(21) Appl. No.: 16/761,736

(22) PCT Filed: Nov. 2, 2018

(86) PCT No.: PCT/US2018/058934
§ 371 (c)(1),
(2) Date: May 5, 2020

(87) PCT Pub. No.: WO2019/094296
PCT Pub. Date: May 16, 2019

(65) Prior Publication Data
US 2020/0338829 A1    Oct. 29, 2020

Related U.S. Application Data

(60) Provisional application No. 62/584,280, filed on Nov. 10, 2017.

(51) Int. Cl.
*B29C 64/214* (2017.01)
*B22F 10/28* (2021.01)
(Continued)

(52) U.S. Cl.
CPC ............ *B29C 64/214* (2017.08); *B22F 10/28* (2021.01); *B22F 10/30* (2021.01); *B22F 12/52* (2021.01);
(Continued)

(58) Field of Classification Search
CPC ... B29C 64/386; B29C 64/393; B29C 64/364; B29C 64/371; B29C 64/153; B22F 10/322; B22F 12/70
See application file for complete search history.

(56) References Cited

U.S. PATENT DOCUMENTS

| 6,046,426 | A | 4/2000 | Jeantette et al. |
| 9,713,575 | B2 * | 7/2017 | Boeckx ..................... A61J 3/10 |

(Continued)

FOREIGN PATENT DOCUMENTS

| WO | WO-2016168172 A1 * | 10/2016 | .............. B22F 10/20 |
| WO | WO2018/022046 A1 | 2/2018 | |
| WO | WO-2018184066 A1 * | 10/2018 | ........... B29C 64/209 |

OTHER PUBLICATIONS

PCT International Search Report Corresponding to PCT/US2018/058934 on Feb. 4, 2019.

*Primary Examiner* — Xiao S Zhao
*Assistant Examiner* — Nicholas J Chidiac
(74) *Attorney, Agent, or Firm* — Dinsmore & Shohl LLP

(57) ABSTRACT

The present disclosure relates to systems, methods, and apparatuses (300) for monitoring the flow of a powder (619). A powder distribution system (605) may include an inlet (622) for receiving powder (619) from a powder reservoir (627). The powder reservoir (627) may include an outlet (618) to supply powder (619) received from the inlet (622). The apparatus (300) may further include a powder flow sensor (620, 621) configured to monitor a quantity of powder supplied by the outlet (618), and wherein the quan-
(Continued)

tity of powder supplied by the outlet (618) is controlled, at least in part by a monitored output of the powder flow sensor (620, 621).

17 Claims, 9 Drawing Sheets

(51) Int. Cl.
  *B22F 10/30* (2021.01)
  *B22F 12/00* (2021.01)
  *B22F 12/52* (2021.01)
  *B22F 12/57* (2021.01)
  *B22F 12/67* (2021.01)
  *B22F 12/70* (2021.01)
  *B22F 12/90* (2021.01)
  *B29C 64/153* (2017.01)
  *B29C 64/393* (2017.01)
  *B33Y 10/00* (2015.01)
  *B33Y 30/00* (2015.01)
  *B33Y 40/00* (2020.01)
  *B33Y 50/02* (2015.01)
  *B22F 12/13* (2021.01)

(52) U.S. Cl.
  CPC .............. *B22F 12/57* (2021.01); *B22F 12/90* (2021.01); *B29C 64/153* (2017.08); *B29C 64/393* (2017.08); *B33Y 10/00* (2014.12); *B33Y 30/00* (2014.12); *B33Y 40/00* (2014.12); *B33Y 50/02* (2014.12); *B22F 12/13* (2021.01); *B22F 12/222* (2021.01); *B22F 12/67* (2021.01); *B22F 12/70* (2021.01)

(56) References Cited

U.S. PATENT DOCUMENTS

| | | | |
|---|---|---|---|
| 10,048,661 B2* | 8/2018 | Arthur | G05B 19/401 |
| 10,518,325 B2* | 12/2019 | Jakimov | B22F 12/70 |
| 10,576,542 B2* | 3/2020 | Holcomb | B22F 10/10 |
| 11,040,492 B2* | 6/2021 | Coeck | B22F 12/90 |
| 2012/0061869 A1* | 3/2012 | Boeckx | B29B 7/726 |
| | | | 425/110 |
| 2016/0136731 A1* | 5/2016 | McMurtry | B29C 64/153 |
| | | | 419/53 |
| 2016/0179064 A1* | 6/2016 | Arthur | G05B 15/02 |
| | | | 700/98 |
| 2016/0193696 A1 | 7/2016 | McFarland et al. | |
| 2016/0368052 A1* | 12/2016 | Jakimov | B29C 64/295 |
| 2017/0216915 A1* | 8/2017 | Holcomb | B33Y 50/02 |
| 2018/0050494 A1* | 2/2018 | Coeck | B33Y 10/00 |
| 2018/0154573 A1* | 6/2018 | Miles | H05K 3/1283 |
| 2019/0060998 A1 | 2/2019 | Kelkar et al. | |
| 2019/0134897 A1 | 5/2019 | Williams et al. | |
| 2019/0184463 A1* | 6/2019 | McMurtry | B22F 10/322 |
| 2019/0184641 A1 | 6/2019 | Swier et al. | |
| 2020/0147883 A1* | 5/2020 | Kennedy | C23C 4/134 |
| 2020/0164435 A1* | 5/2020 | Holcomb | B33Y 70/00 |

* cited by examiner

CLOSED LOOP GATED RECOATER MONITORING SYSTEM

PRIORITY INFORMATION

The present applicant claims priority to U.S. Provisional Patent Application Ser. No. 62/584,280 titled "Closed Loop Gated Recoater Monitoring System" filed on Nov. 10, 2017, the disclosure of which is incorporated by reference herein.

FIELD

The present disclosure generally relates to methods and systems adapted to perform additive manufacturing ("AM") processes, for example by direct melt laser manufacturing ("DMLM"). The process utilizes an energy source that emits an energy beam to fuse successive layers of powder material to form a desired object. More particularly, the disclosure relates to methods and systems that monitor powder flow from a powder distribution system onto a build surface.

BACKGROUND

Additive manufacturing (AM) techniques may include electron beam freeform fabrication, laser metal deposition (LIVID), laser wire metal deposition (LMD-w), gas metal arc-welding, laser engineered net shaping (LENS), laser sintering (SLS), direct metal laser sintering (DMLS), electron beam melting (EBM), powder-fed directed-energy deposition (DED), and three dimensional printing (3DP), as examples. AM processes generally involve the buildup of one or more materials to make a net or near net shape (NNS) object in contrast to subtractive manufacturing methods. Though "additive manufacturing" is an industry standard term (ISO/ASTM52900), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. As an example, a particular type of AM process uses an energy beam, for example, an electron beam or electromagnetic radiation such as a laser beam, to sinter or melt a powder material and/or wire-stock, creating a solid three-dimensional object in which a material is bonded together.

Selective laser sintering, direct laser sintering, selective laser melting, and direct laser melting are common industry terms used to refer to producing three-dimensional (3D) objects by using a laser beam to sinter or melt a fine powder. For example, U.S. Pat. Nos. 4,863,538 and 5,460,758 describe conventional laser sintering techniques. More specifically, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Electron beam melting (EBM) utilizes a focused electron beam to melt powder. These processes involve melting layers of powder successively to build an object in a metal powder.

FIG. 1 is schematic diagram showing a cross-sectional view of an exemplary conventional system for direct metal laser sintering (DMLS) or direct metal laser melting (DMLM). The apparatus builds objects, for example, the part 122, in a layer-by-layer manner by sintering or melting a powder material (not shown) using an energy beam 136 generated by a source such as a laser 120. The powder to be melted by the energy beam is supplied by reservoir 126 and spread evenly over a build plate 114 using a recoater arm 116 travelling in direction 134 to maintain the powder at a level 118 and remove excess powder material extending above the powder level 118 to waste container 128. The energy beam 136 sinters or melts a cross sectional layer of the object being built under control of the galvo scanner 132. The build plate 114 is lowered and another layer of powder is spread over the build plate and object being built, followed by successive melting/sintering of the powder by the laser 120. The process is repeated until the part 122 is completely built up from the melted/sintered powder material. The laser 120 may be controlled by a computer system including a processor and a memory. The computer system may determine a scan pattern for each layer and control laser 120 to irradiate the powder material according to the scan pattern. After fabrication of the part 122 is complete, various post-processing procedures may be applied to the part 122. Post processing procedures include removal of excess powder, for example, by blowing or vacuuming, machining, sanding or media blasting. Further, conventional post processing may involve removal of the part 122 from the build platform/substrate through machining, for example. Other post processing procedures include a stress release process. Additionally, thermal and chemical post processing procedures can be used to finish the part 122.

The abovementioned AM processes is controlled by a computer executing a control program. For example, the apparatus includes a processor (e.g., a microprocessor) executing firmware, an operating system, or other software that provides an interface between the apparatus and an operator. The computer receives, as input, a three dimensional model of the object to be formed. For example, the three dimensional model is generated using a computer aided design (CAD) program. The computer analyzes the model and proposes a tool path for each object within the model. The operator may define or adjust various parameters of the scan pattern such as power, speed, and spacing, but generally does not program the tool path directly. One having ordinary skill in the art would fully appreciate the abovementioned control program may be applicable to any of the abovementioned AM processes.

FIG. 2 is a powder bed containing an object made by an additive manufacturing process according to the prior art. There is a powder bed 200 containing an object 201 made by an additive manufacturing process and system according to the prior art. The powder bed 200 is filled with excess powder 202 and has powder bed walls 203. The powder bed 200 moves down the object is formed.

The above additive manufacturing techniques may be used to form a component from any material conducive to an AM process. For example polymers, ceramics and various plastics may be formed. Further, metallic objects can be formed from materials such as stainless steel, aluminum, titanium, Inconel 625, Inconel 718, Inconel 188, cobalt chrome, among other metal materials or any alloy, for example. The above alloys may further include materials with trade names, Haynes 188®, Haynes 625®, Super Alloy Inconel 625™, Chronin® 625, Altemp® 625, Nickelvac® 625, Nicrofer® 6020, Inconel 188, and any other material having material properties attractive for the formation of components using the abovementioned techniques.

A problem that arises when making additive manufactured components is that, if problems arise in the flow of powder onto the build surface then the powder may be improperly sintered or melted. This can lead to build imperfections, which if not detected, may result in structural weakness in the completed object. A solution is desired, for monitoring the flow of powder from recoater, to reduce the likelihood that small changes in powder flow will impact the quality of a built object.

BRIEF DESCRIPTION

Aspects and advantages will be set forth in part in the following description, or may be obvious from the description, or may be learned through practice of the invention.

The present disclosure is related to an apparatus that reduces the aforementioned undesirable situations. An embodiment of the present invention is related to an apparatus for making an object from powder. Various aspects may include a powder reservoir, a powder distribution system including an inlet for receiving powder from the reservoir, an outlet for supplying powder received from the inlet, a powder flow sensor configured to monitor a quantity of powder supplied by the outlet, and wherein the quantity of powder supplied by the outlet is controlled, at least in part by a monitored output of the powder flow sensor.

In some aspects the monitored quantity of powder supplied may be a volume of powder.

In some aspects, a processor of the apparatus may be configured to signal a powder distribution system failure based, at least in part on determining that the monitored output that does not satisfy a powder flow threshold.

In some aspects, the powder flow sensor may be an optical sensor. In some aspects, the powder flow sensor may be an inductive sensor. In some aspects, the powder flow sensor may be a capacitive sensor. In some aspects, the powder flow sensor may be a tactile sensor.

In some aspects, the powder distribution system further may include a powder distribution member having a plurality of openings for supplying powder to the outlet, wherein powder is supplied to the distribution member by a metering roller based, at least in part, on the monitored output of the powder flow sensor.

In some aspects, the apparatus may be configured to provide powder to an additive manufacturing machine during an additive manufacturing process. In such aspects, the apparatus may provide powder during the additive manufacturing of an object, wherein the apparatus provides powder to at least a portion of object to be solidified.

Various aspects may include methods and apparatus for implementing those methods for monitoring powder flow in additive manufacturing. Various aspects may include monitoring, by a powder flow sensor, a quantity of a flow of powder from an outlet of a powder distribution system onto a build surface, determining whether the monitored output satisfies a flow threshold, determining whether the monitored output is within a flow range in response to determining that the powder flow does not satisfy the threshold, and modifying a flow of powder from the outlet based, at least in part, on determining that the monitored output is within the flow range.

Some aspects may include generating a powder distribution system health alert in response to determining that the monitored output is not within the flow range.

In such aspects, modifying the flow of powder from the outlet based, at least in part, on determining that the monitored output is within the flow range may include controlling the quantity of powder supplied at the outlet based, at least in part on a difference between the monitored output and the flow threshold. These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
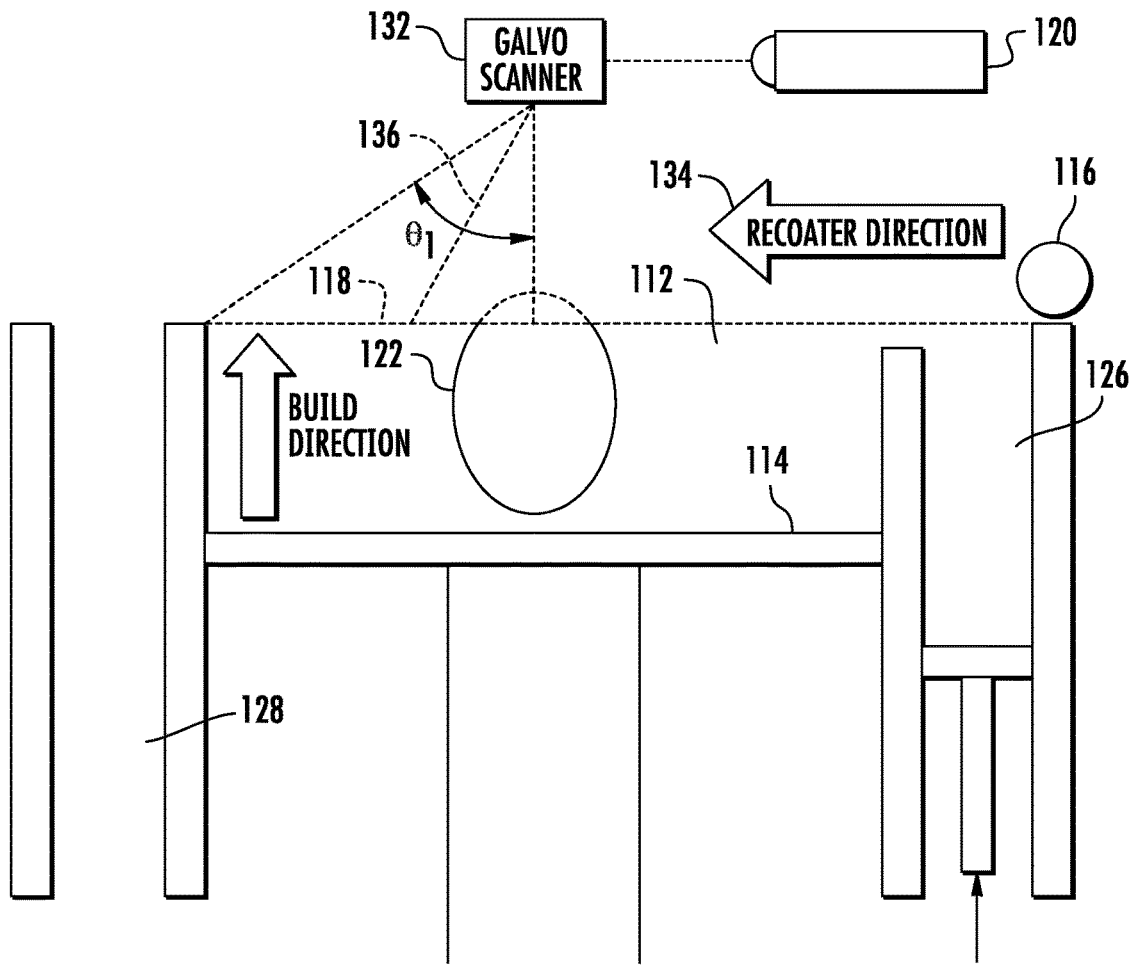
FIG. 1 is schematic diagram showing an example of a conventional apparatus for additive manufacturing.
Figure 2:
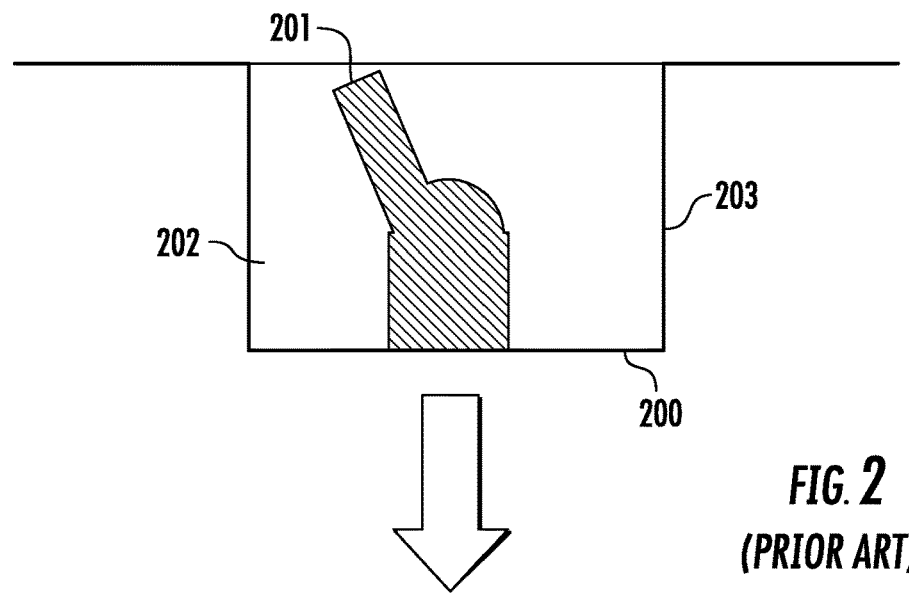
FIG. 2 is a powder bed containing an object made by an additive manufacturing process according to the prior art.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 6:
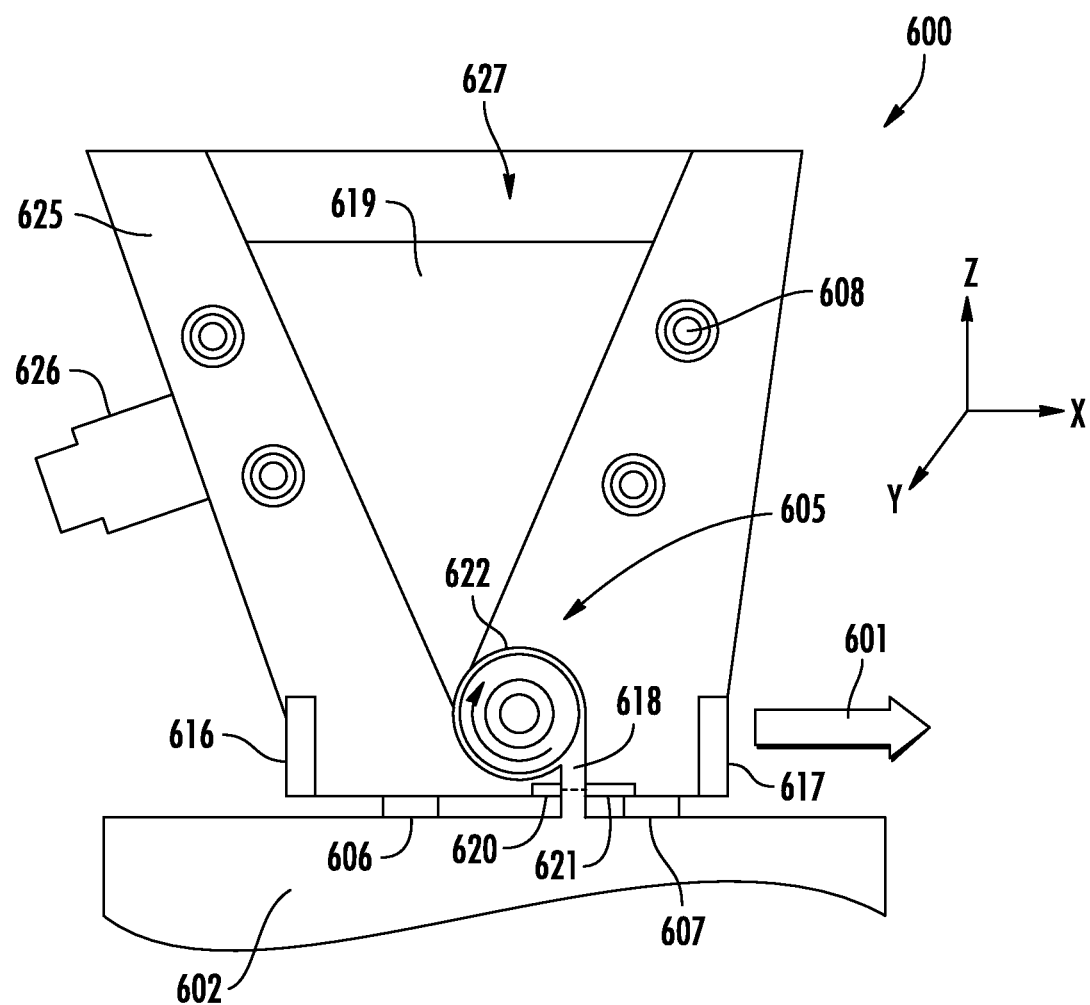
FIG. 6 is a cutaway side view of the recoater apparatus in accordance with various aspects of the disclosure.

In one aspect of the invention, as shown in FIG. 6, a recoater apparatus of an additive manufacturing machine may include a powder distribution system configured to deposit powder onto a build surface. As powder flows from the powder distribution system, the volume or density of the powder may be measured by a powder flow sensor. This powder flow sensor may report the measured powder flow to a controller for determination as to whether powder flow is acceptable. Acceptable powder flow, i.e., that which meets a threshold or falls within an acceptable range, may trigger some or no modification by the powder distribution system. However, monitored output that falls outside of the flow range, may trigger the generation of a system health alert, indicating to an engineer or administrator that a potential serious problem exists within the powder distribution system or the recoater apparatus.

Additional details for re-coater apparatus that can be used in accordance with the present invention may be found in U.S. patent application Ser. No. 15/406,444, titled "Additive Manufacturing Using a Dynamically Grown Build Envelope," filed Jan. 13, 2017; U.S. patent application Ser. No. 15/688,426, titled "Powder Bed Re-Coater Apparatus and Methods of Use Thereof," filed Aug. 28, 2017 the disclosures of which are incorporated herein by reference. The disclosures of the above applications are incorporated herein in their entirety to the extent that they disclose additional aspects of powder bed additive manufacturing methods and systems that can be used in conjunction with those disclosed herein.

Figure 3:
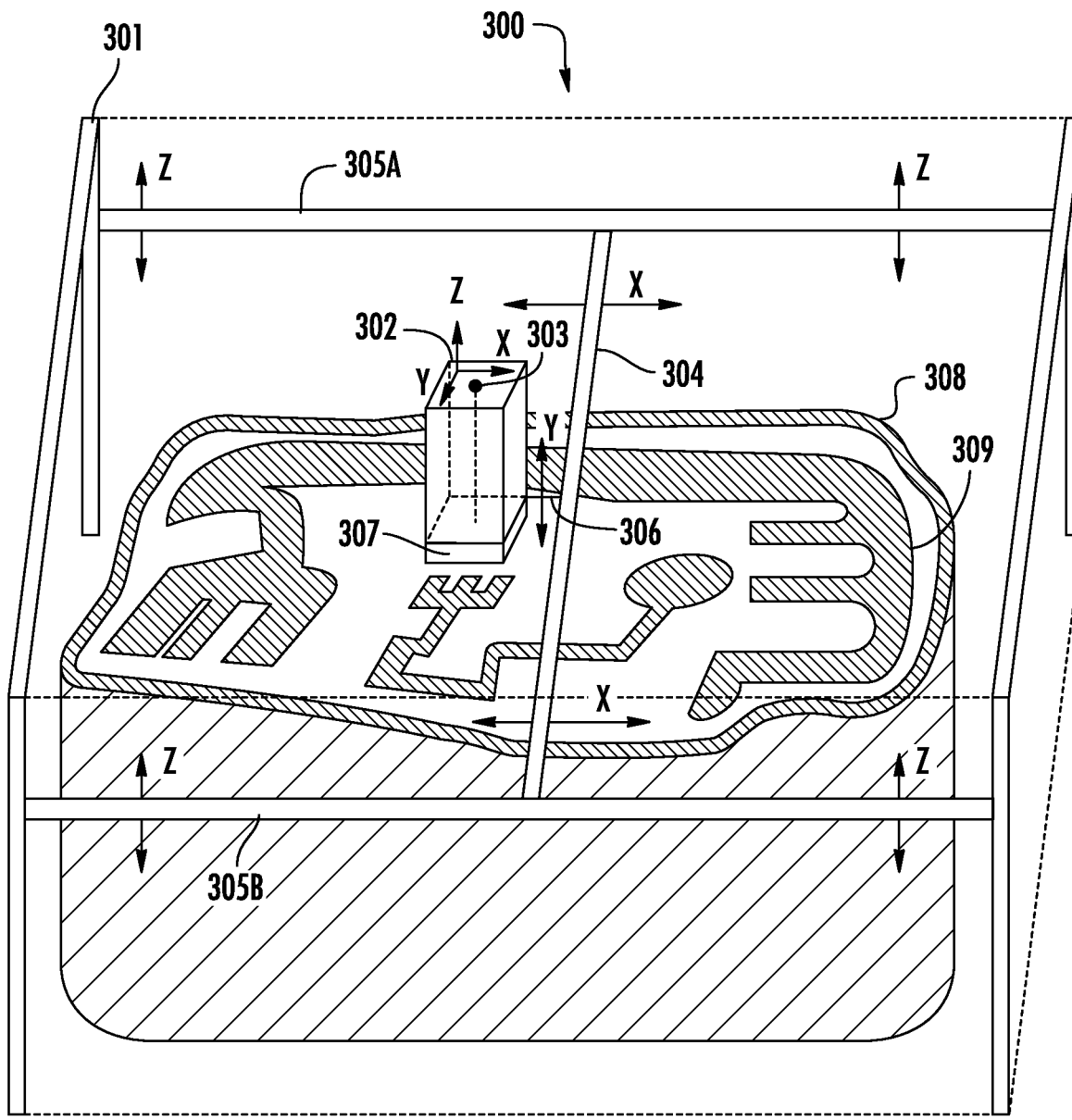
FIG. 3 is a large scale additive manufacturing machine 300 according to an aspect of the present disclosure.

FIG. 3 shows an example of one embodiment of a large-scale additive manufacturing apparatus 300 according to the present invention. Many of the features of this system are described in U.S. Pat. No. 10,022,794, titled "Additive Manufacturing Using a Mobile Build Volume"; U.S. patent application Ser. No. 15/406,454, titled "Additive Manufacturing Using a Mobile Scan Area," filed Jan. 13, 2017; U.S. patent application Ser. No. 15/406,444, titled "Additive Manufacturing Using a Dynamically Grown Build Envelope," filed Jan. 13, 2017; U.S. patent application Ser. No. 15/406,461, titled "Additive Manufacturing Using a Selective Recoater," filed Jan. 13, 2017; U.S. patent application Ser. No. 15/609,965, titled "Apparatus and Method for Continuous Additive Manufacturing," filed May 31, 2017; U.S. patent application Ser. No. 15/406,471, titled "Large Scale Additive Machine," filed Jan. 13, 2017; U.S. patent application Ser. No. 15/406,454, titled "Additive Manufacturing Using a Mobile Scan Area," filed Jan. 13, 2017. These disclosures are incorporated by reference herein.

The apparatus 300 comprises a positioning system 301, a build unit 302 comprising an irradiation emission directing device 303, a laminar gas flow zone 307, and a build plate (not shown in this view) beneath an object being built 309. The maximum build area is defined by the positioning system 301, instead of by a powder bed as with conventional systems, and the build area for a particular build can be confined to a build envelope 308 that may be dynamically built up along with the object. The gantry 301 has an x crossbeam 304 that moves the build unit 302 in the x direction. There are two z crossbeams 305A and 305B that move the build unit 302 and the x crossbeam 304 in the z direction. The x cross beam 304 and the build unit 302 are attached by a mechanism 306 that moves the build unit 302 in the y direction. In this illustration of one embodiment of the invention, the positioning system 301 is a gantry, but the present invention is not limited to using a gantry. In general, the positioning system used in the present invention may be any multidimensional positioning system such as a delta robot, cable robot, robot arm, etc. The irradiation emission directing device 303 may be independently moved inside of the build unit 302 by a second positioning system (not shown). The atmospheric environment outside the build unit, i.e. the "build environment," or "containment zone," is typically controlled such that the oxygen content is reduced relative to typical ambient air, and so that the environment is at reduced pressure.

Figure 4:
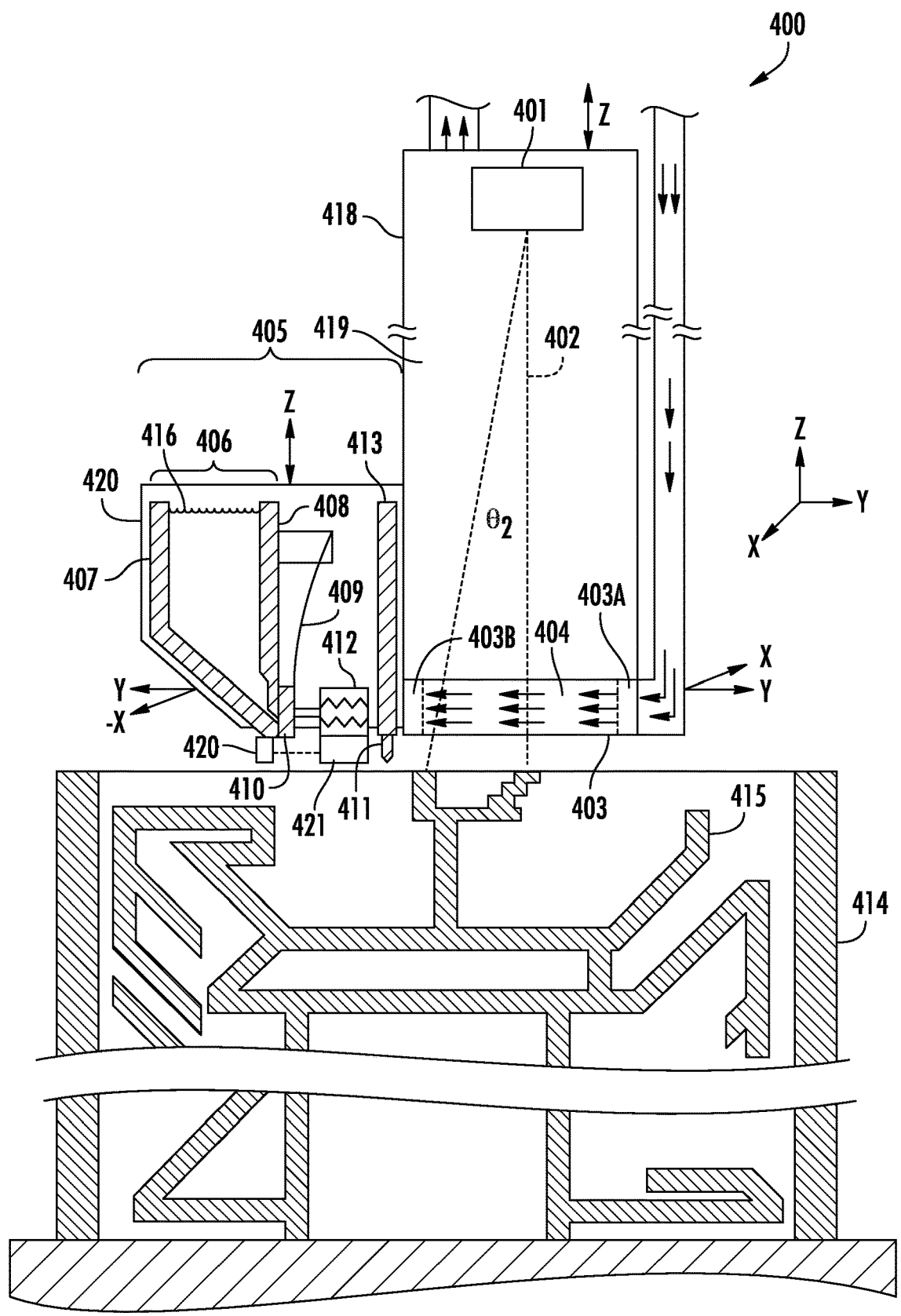
FIG. 4 is a mobile additive manufacturing unit 400 according to an aspect of the present disclosure.

FIG. 4 shows, in more detail, an exemplary mobile additive manufacturing unit 400 according to an embodiment of the invention. There is irradiation emission directing device 401 for generating an energy beam 402, a gas flow device 403 with a pressurized outlet portion 403A and a vacuum inlet portion 403B providing gas flow to a gasflow zone 404, and a recoater 405. Above the gasflow zone 404 there is an enclosure 418 containing an inert environment 419. The recoater 405 has a hopper 406 comprising a back plate 407 and a front plate 408. The recoater 405 also has at least one actuating element 409, at least one gate plate 410, a recoater blade 411, an actuator 412, and a recoater arm 413. FIG. 4 also shows a build envelope 414 that may be built by, for example, additive manufacturing or Mig/Tig welding, an object being formed 415, and powder 416 contained in the hopper 405 used to form the object 415.

In this particular embodiment, the actuator 412 activates the actuating element 409 to pull the gate plate 410 away from the front plate 408. In an embodiment, the actuator 412 may be, for example, a pneumatic actuator, and the actuating element 409 may be a bidirectional valve. In an embodiment, the actuator 412 may be, for example, a voice coil, and the actuating element 409 may be a spring. There is also a hopper gap between the front plate 408 and the back plate 407 that allows powder to flow when a corresponding gate plate is pulled away from the powder gate by an actuating element. As powder flows from the powder distribution system the volume or density of the powder may be measured by a powder flow sensor 420, which in one aspect detects the percentage transmission of laser light from laser source 421 as powder is delivered from the hopper 406. This powder flow sensor 420 may report the measured powder flow to a controller for determination as to whether powder flow is acceptable. Acceptable powder flow, that which meets a threshold or falls within an acceptable range, may trigger some or no modification by the powder distribution system. However, monitored output that falls outside of the flow range, may be trigger the generation of a system health alert, indicating to an engineer or administrator that a potential serious problem exists within the powder distribution system or the recoater apparatus.

The powder 416, the back plate 407, the front plate 408, and the gate plate 410 may all be the same material. Alternatively, the back plate 407, the front plate 408, and the gate plate 410 may all be the same material, and that material may be one that is compatible with the powder material, such as cobalt-chrome. In this particular illustration of one embodiment of the present invention, the gas flow in the gasflow zone 404 flows in the y direction, but it does not have to. The recoater blade 411 has a width in the x direction. The direction of the irradiation emission beam when $\theta 2$ is approximately 0 defines the z direction in this view. The gas flow in the gasflow zone 404 may be substantially laminar. The irradiation emission directing device 401 may be independently movable by a second positioning system (not shown). This illustration shows the gate plate 410 in the closed position.

Figure 5:
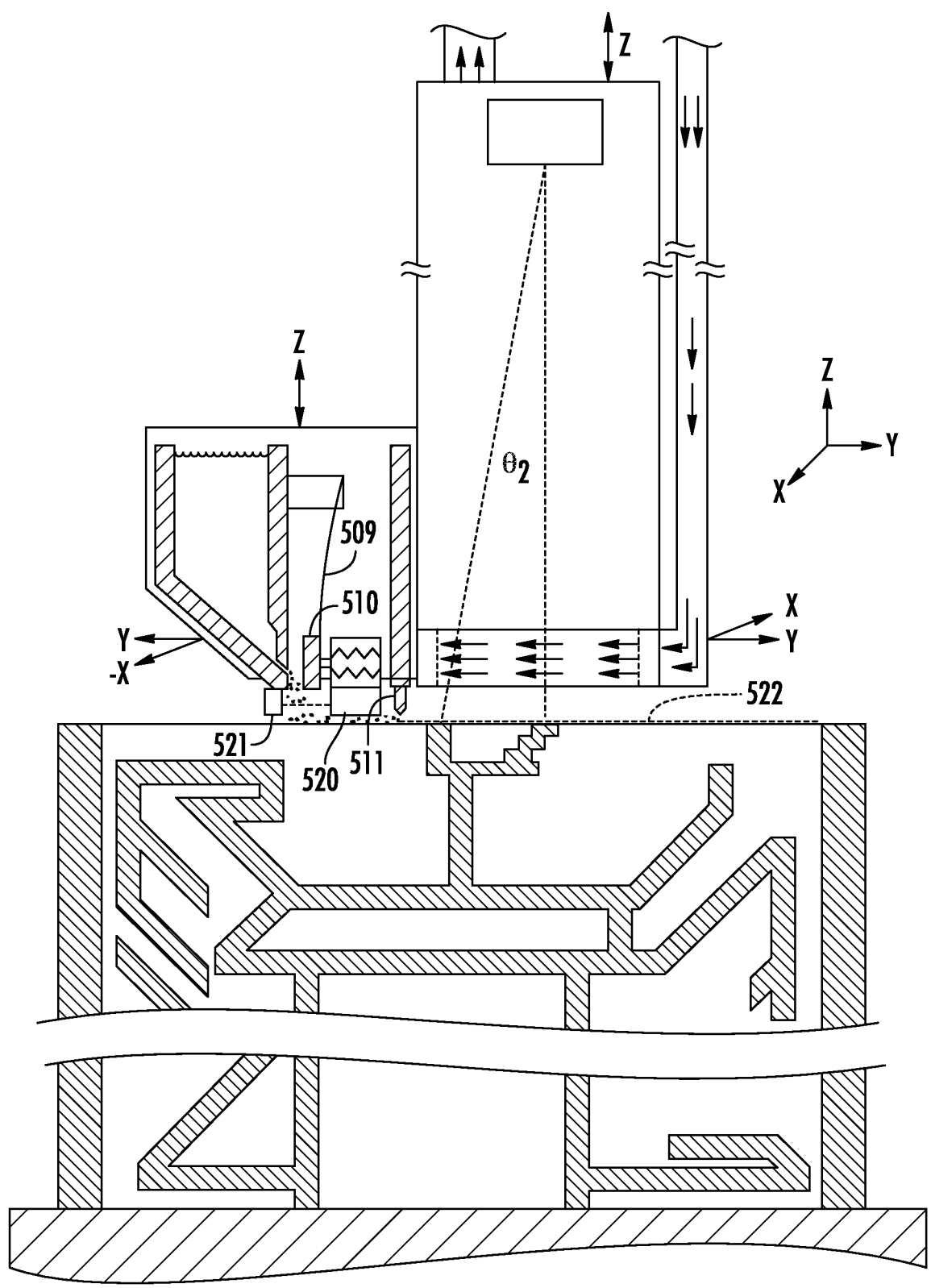
FIG. 5 is an additive manufacturing system 500 according to an aspect of the present disclosure.

FIG. 5 shows the build unit of FIG. 4, with the gate plate 410 in the open position (as shown by element 510) and actuating element 509. Powder in the hopper is deposited to make fresh powder layer 522, which is smoothed over by the recoater blade 511 to make a substantially even powder layer 522. As powder flows from the powder distribution system the volume or density of the powder may be measured by a powder flow sensor 520, which in one aspect detects the percentage transmission of laser light from laser source 521 as powder is delivered from the hopper 406. This powder flow sensor 520 may report the measured powder flow to a controller for determination as to whether powder flow is acceptable.

The exemplary recoater apparatus 600 shown in FIG. 6 may include a frame 625 extending along the y-axis and having a dimension along the y-axis that is greater than the dimension of the recoater apparatus in the x-axis, for example. Additional details of the recoater apparatus are generally disclosed in U.S. patent application Ser. No. 15/688,426, titled "Powder Bed Re-Coater Apparatus and Methods of Use Thereof," filed Aug. 28, 2017.

The frame may include a hopper 627 for containing a powder 619 to be distributed to the powder bed 602. The frame may further include heaters 608 for preheating the powder 619 in the hopper 627. The frame 625 may also include a powder distribution system 605. The powder distribution system 605 may comprise a variety of powder outlet control means appropriately for the powder 619 being conveyed by the powder distribution system. Accordingly, powder can be precisely supplied to the powder bed 602 as the recoater apparatus moves in direction 601.

The recoater apparatus may further include an aft sweep strip 606 and a forward sweep strip 607. The sweep strips 606 and 607 may be positioned such that the powder supply exit 618 is located between the sweep strips 606 and 607. Thus, the sweep strips 606 and 607 may function as a shield to block gas flow from interfering with the powder distribution process. The sweep strips may be adjustable along the z-axis either through height (i.e. z-axis) adjustment of the recoater apparatus 600, or the sweep strips may be individually adjustable along the z-axis through an individual adjustment mechanism on each of the forward and aft sweep strips. Further, the height of each of the forward sweep strip 607 and aft sweep strip 606 may be adjustable through tilting of the recoater apparatus in combination with the above-mentioned height adjustment of the recoater apparatus 600. As discussed below, the sweep strips may be adjusted using any one of or combination of the aforementioned methods such that the sweep strips do not contact or minimally contact the powder bed while effectively blocking gas flow which may interfere with the powder distribution process. Further, the sweep strip height may be controlled to sweep powder across the powder bed. Each of the sweep strips may be comprised of a soft pliable material (e.g. a foam, silicone, rubber), a rigid or semi rigid material.

The sweep strips 607 and/or 606 may also be configured to remove a quantity of powder from a build region. For example, while a build process progresses by solidifying powder, a portion of the build may begin to increase in height at a faster rate than another portion of the build. In other words, with reference to FIG. 6 for example, a first portion of the build may extend further in the Z direction than a second portion of the build. Thus, if powder is continuously supplied and fused at the same rate at the first portion and the second portion the dimensions of the completed component may be effected and/or build problems may arise. In order to prevent such problems, as the component is being built, the sweep strips 607 and/or 606 may serve a leveling function by removing and/or limiting the supply of powder to the portion of the build that extends further in the Z direction, by selectively controlling the amount of powder that is supplied to each region (either using the below mentioned methods of supply and/or by removing powder via the sweep strips) a more consistent build may be achieved, and problems such as those discussed in the abovementioned background section may be avoided.

The recoater apparatus 600 may further include several sensors to assure that powder is precisely metered and distributed along the surface of the powder bed and/or the build component in the powder bed. As an example, the recoater apparatus 600 may include a photo-emitter-receiver pair 620, 621 to sense the consistency and uniformity of powder flow through the passage 622, the powder supply exit 618. It is noted that the abovementioned sensor locations may be used in any combination to determine the amount of powder being supplied to the powder bed. Further, it is noted that a plurality of sensors may be located in each location In various aspects the recoater apparatus 600 may include one or more powder flow sensors that measure the volume and/or density of powder flowing from the powder distribution system 605 or the powder supply exit 618. For example a sensor may be positioned across the outlet opening of the powder distribution system 605, where the powder flow sensor may measure the flow of powder from the powder distribution system 605 to the powder bed. Precise positioning of the sensor may depend on the type of sensor employed. Some aspects may include one or more of optical sensors (e.g., laser sensors), inductive sensors (e.g., proximity sensors), capacitive sensors, and tactile (e.g., pressure) sensors. The one or more powder flow sensors may pass monitored output to a recoater apparatus controller for use in controlling the flow of powder from the recoater apparatus 600.

Based on the output of any of the powder flow sensors, the powder distribution system 605 may adjust the flow of powder 619. For example, the control system of the recoater apparatus 600 may determine whether the monitored output represents a powder flow that lies within a flow range of normal or acceptable flow volume/density. If the monitored output does correspond to powder flow volume/density that lies within the flow range, then the powder distribution system may adjust components of the powder distribution system to increase or decrease powder flow. Conversely, if the monitored output corresponds to a powder flow that does not lie within the flow range, then the controller may generate a system health alert indicating that a leakage or blockage may be present. In such cases, the recoater apparatus 600 may optionally cease the build session until the system health alert is resolved. The various aspects may be implemented with recoaters that do not dynamically adjust powder flow, as well as in systems utilizing stationary recoaters. In such aspects, the powder flow feedback may be advantageous for identifying system health problems such as blockages or leakages in the powder distribution system 618.

Figure 7:
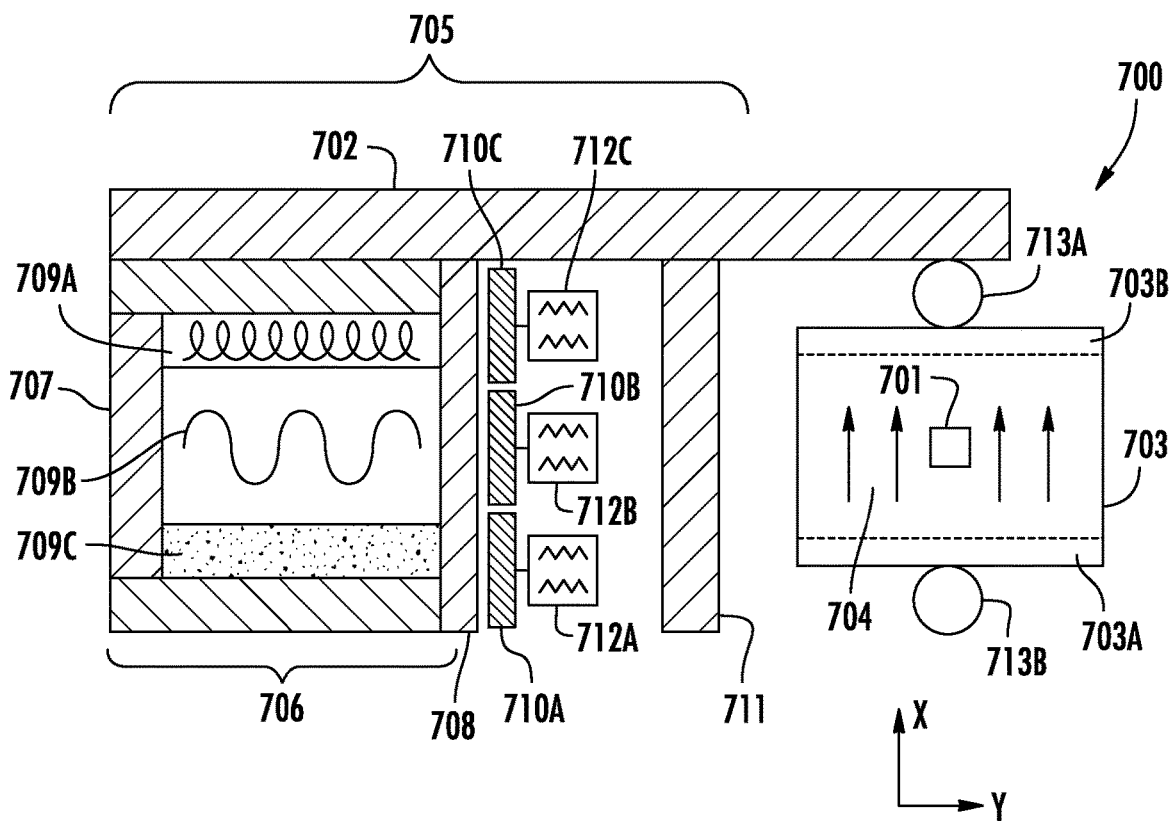
FIG. 7 shows a top view of a build unit according to an embodiment of the invention.

FIG. 7 shows a top down view of the recoater of FIG. 6. For simplicity, the object and the walls are not shown here. A build unit 700 has an irradiation emission directing device 701, an attachment plate 702 attached to the gasflow device 703, hopper 706, and recoater arm 711. The gasflow device has a gas outlet portion 703A and a gas inlet portion 703B. Within the gasflow device 703 there is a gasflow zone 704. The gasflow device 703 provides laminar gas flow within the gasflow zone 704. There is also a recoater 705 with a recoater arm 711, actuating elements 712A, 712B, and 712C, and gate plates 710A, 710B, and 710C. The recoater 705 also has a hopper 706 with a back plate 707 and front plate 708. In this particular illustration of one embodiment of the present invention, the hopper is divided into three separate compartments containing three different materials 709A, 709B, and 709C. There are also gas pipes 713A and 713B that feed gas out of and into the gasflow device 703.

In an aspect, powder flow sensors (e.g., powder flow sensors 620, 621) may be disposed within each area serviced by gate plates 710A, 710B, 710C. Each of the powder flow sensors associated with each gate plate may be communicatively or electrically independent of the other powder flow sensors. Alternatively, each powder flow sensor may form a component of a common feedback control mechanism. For example, if a powder flow sensor associated with gate plate 710A detects a reduce flow of powder from the hopper, the sensor may signal to one or more elements of the recoater apparatus 700, that the flow of powder through gate plate 710A should be modified. In some aspects, the flow of powder through some or all of the remaining gate plates may be modified in order to maintain even material proportions during a build session.

Figure 8A:
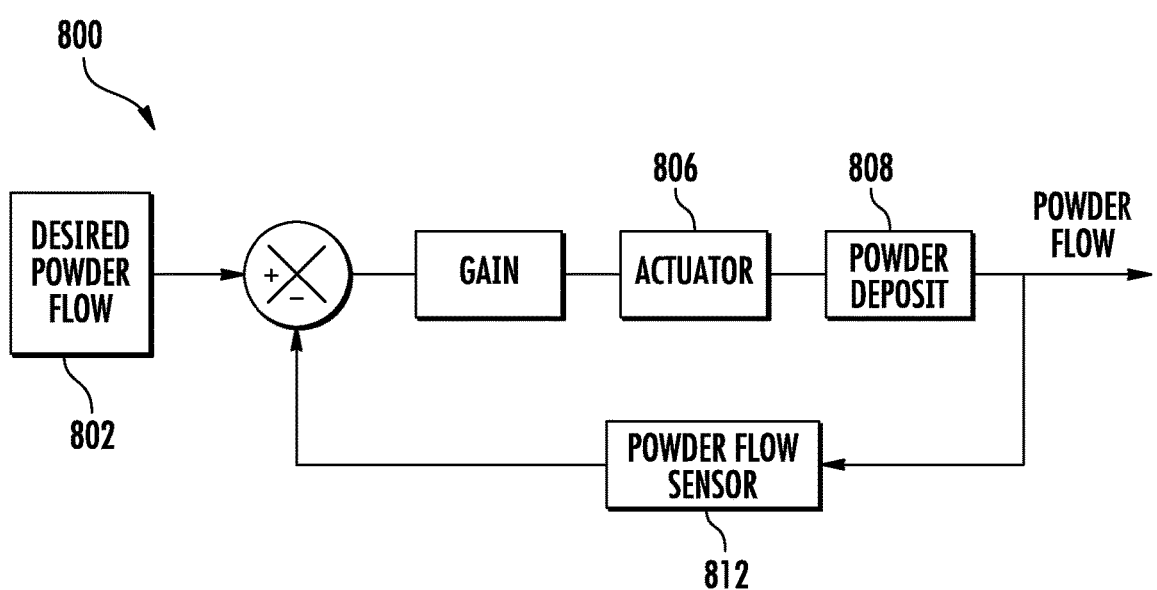
FIG. 8A is a schematic of an exemplary closed gate feedback control flow according to various aspects of the present disclosure.
Figure 8B:
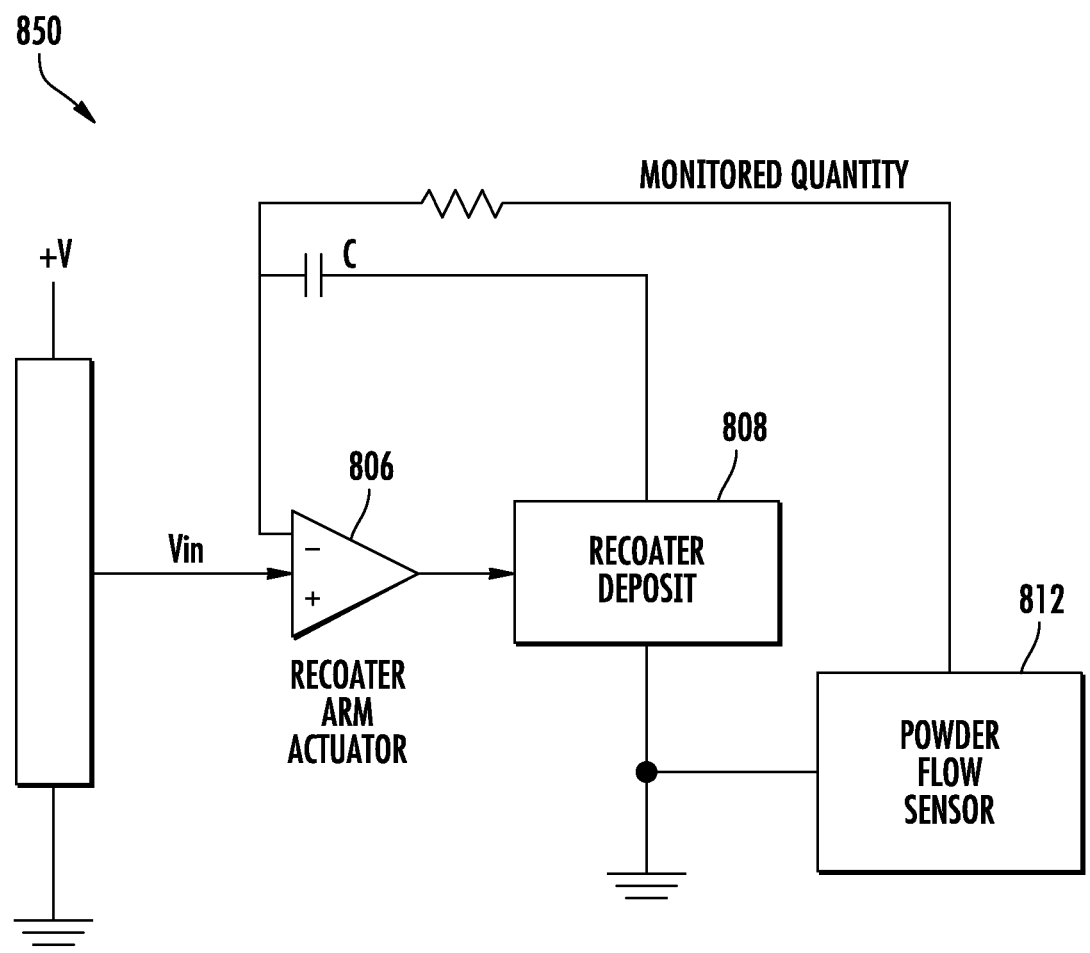
FIG. 8B is an electrical schematic of an exemplary closed gate feedback circuit according to various aspects of the present disclosure.

The control flow 800 of FIG. 8A and electrical circuit 850 of FIG. 8B illustrates an exemplary feedback from the powder flow sensor 812. The powder flow sensor 812 may measure the volume or density of powder flow through the powder distribution system, e.g., powder deposited 808. The output of the powder flow sensor may be passed to the controller and subtracted or otherwise compared to a desired powder flow 802 in order to determine an error. This error may be the "monitored output" which may be compared to the flow range or a flow threshold in order to determine whether the flow of powder from the powder distribution system is acceptable or even health. The monitored output may be is amplified by the controller, which may output makes the necessary correction to one or more actuators controlling mechanisms of the powder distribution system to reduce any error.

For example, if the monitored output is below a threshold (e.g., 0 [the difference between the desired powder flow 802 and the output of the powder flow sensor 812])) then the flow of powder as measured by the powder flow sensor 812 is greater than the desired powder flow 802. The actuator 806 may adjust one or more mechanisms of the powder distribution system to reduce the flow of powder. By monitoring the flow of powder and adjusting powder flow from the powder distribution system accordingly, the proposed control scheme may improve stability of powder flow by reducing error/variation in flow and increase tolerance for powder flow variations by reducing the length of time over which such variations occur.

In some aspects, the output of the powder flow sensor 812 may be used to calculate an amount of powder dispensed from the recoater apparatus. For example, the output of the powder flow sensor 812 may be used by a controller/processor of the additive manufacturing device to determine how much material has been dispensed from a hopper, such as by tracking the volume of powder dispensed over a given period of time. Tracking the amount of material dispensed may more efficient refill of the powder hopper, or may enable detection of trends in powder flow problems at particular levels of powder dispensing.

In various aspects the control flow 800 may be via the illustrated exemplary electrical circuit 850. The electrical circuit 850 is a closed-loop tachometer-feedback motor control circuit, which may use an operational amplifier (op-amp) as a controller. Various aspects may include other variations and permutations depending on the type of sensor use and the mechanisms of the powder distribution system.

Figure 9:
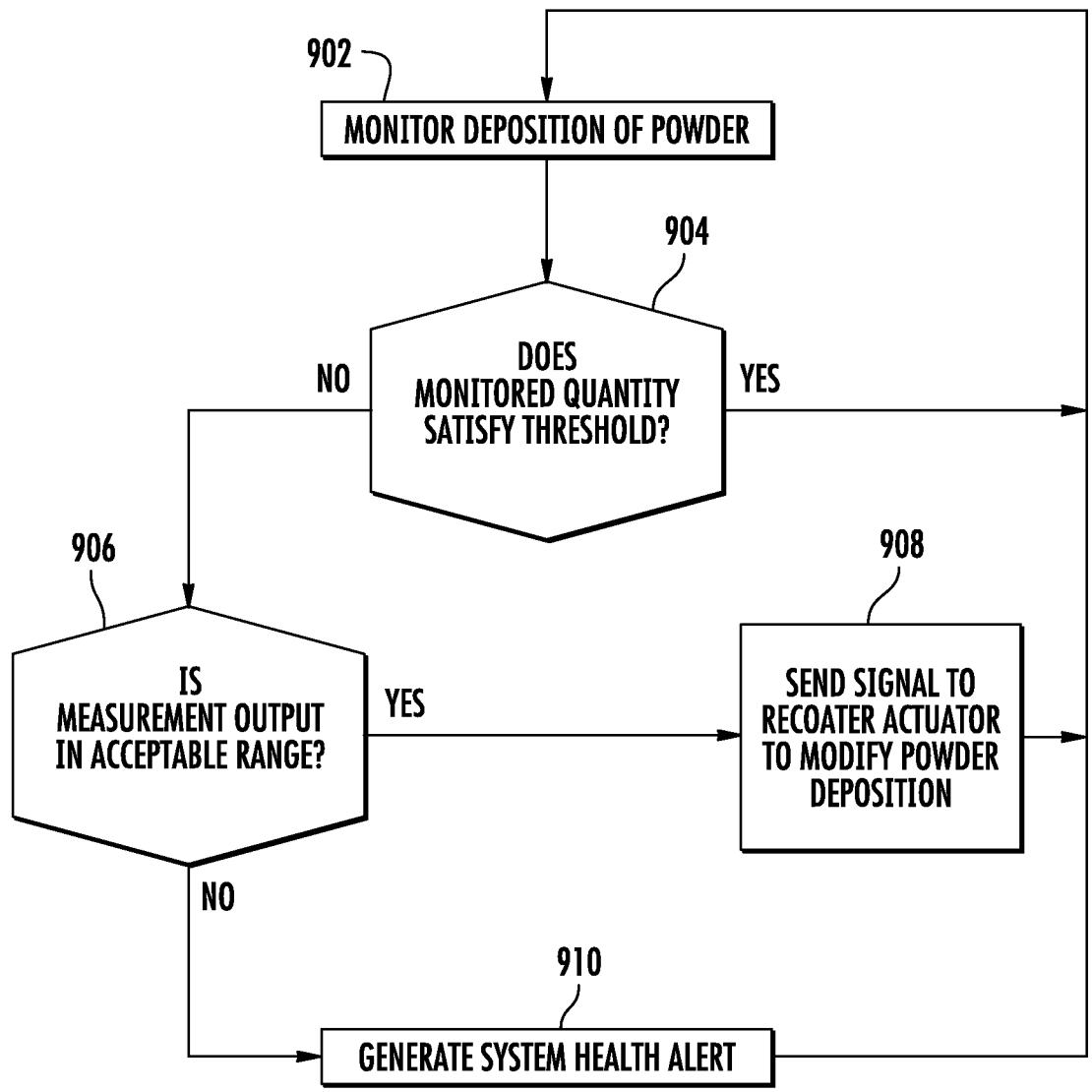
FIG. 9 is a process flow diagram illustrating an aspect method for monitoring the flow of powder from a powder distribution system during additive manufacturing according to various aspects of the present disclosure.

FIG. 9 illustrates a method 900 for monitoring the flow of powder from a powder distribution system onto a build surface in an additive manufacturing system. With reference to FIGS. 3-9, method 900 may use one or more powder flow sensors to monitor the flow of powder from a powder distribution system (e.g., powder distribution system 605) onto a build surface (e.g., powder bed 602). Monitoring the flow of powder onto the build surface may enable the apparatus to rapidly detect flow irregularities such as outlet blockages or reservoir leaks. Rapid identification of flow irregularities may enable the additive manufacturing system to quickly alter powder flow or cease operations, thereby reducing the risk that an object will be built with structural flows attributable to powder distribution inconsistencies.

In block 902, a powder flow sensor of the apparatus may monitor the a quantity of a flow of powder from an outlet of a powder distribution system onto a build surface. The powder flow sensor may be positioned in the aperture of the outlet, near the outlet, or any other position appropriate for the type of powder flow sensor employed. The sensor may detect powder flowing from the powder distribution system and may calculate or otherwise determine a volume of powder flowing through the outlet (e.g., a volume over a predetermined time interval).

In determination block 904, the processor of the additive manufacturing device may determine whether the monitored output satisfies a flow threshold. The apparatus may compare the monitored output to a desired powder flow to determine a difference. This difference may be compared to the flow threshold to determine whether the difference is greater than, equal to or less than the flow threshold. A result of this comparison provides an indication as to whether powder flow modification is needed.

In some aspects, the flow threshold may be the desired powder flow and the monitored output may be compared directly to the desired powder flow to determine whether the two values are equal.

In response to determining that the monitored output does not satisfy the flow threshold (i.e., determination block="no"), the processor may in determination block 906, determine whether the monitored output is within a flow range. If the difference between the monitored output and the desired powder flow is not equal to the flow threshold, then the volume or density of powder flow from the outlet of the powder distribution system is not optimal. The apparatus may determine whether monitored output lies within a range of acceptable variation, the flow range. This range may represent the spectrum of powder flows that may be permitted without causing detriment to the build object.

In response to determining that the monitored output is within the flow range (i.e., determination block 906="yes"), a controller of the powder distribution system may modify a flow of powder from the outlet, in block 908. This may include controlling the quantity of powder supplied at the outlet based, at least in part on a difference between the monitored output and the flow threshold.

In response to determining that that the monitored output is not within the flow range (i.e., determination block 906="no"), the processor may generate a powder distribution system health alert in block 910. This alert may be transmitted to an administrator system, displayed via a display of the apparatus, or otherwise communicate a problem to an administrator. The system health alert may indicate that a blockage or leakage is present in the powder distribution system. Such abnormalities may result in monitored outputs lying outside the range of acceptable variation. If left unchecked, flow variations sufficient to trigger a system health alert may produce fatal imperfections in an associated build object. In some aspects, the generation of a system health alert may cause a temporary cessation of building by the apparatus.

Various aspects may include generating a powder distribution system health alert that is specific to a gate associated with the outlet or portion of the outlet where a problem was detected. The system may generate an alert indicating that powder flowing through an area associated with a gate plate (e.g., gate plate 710A) may be outside of the acceptable range of powder flow volume.

Figure 10:
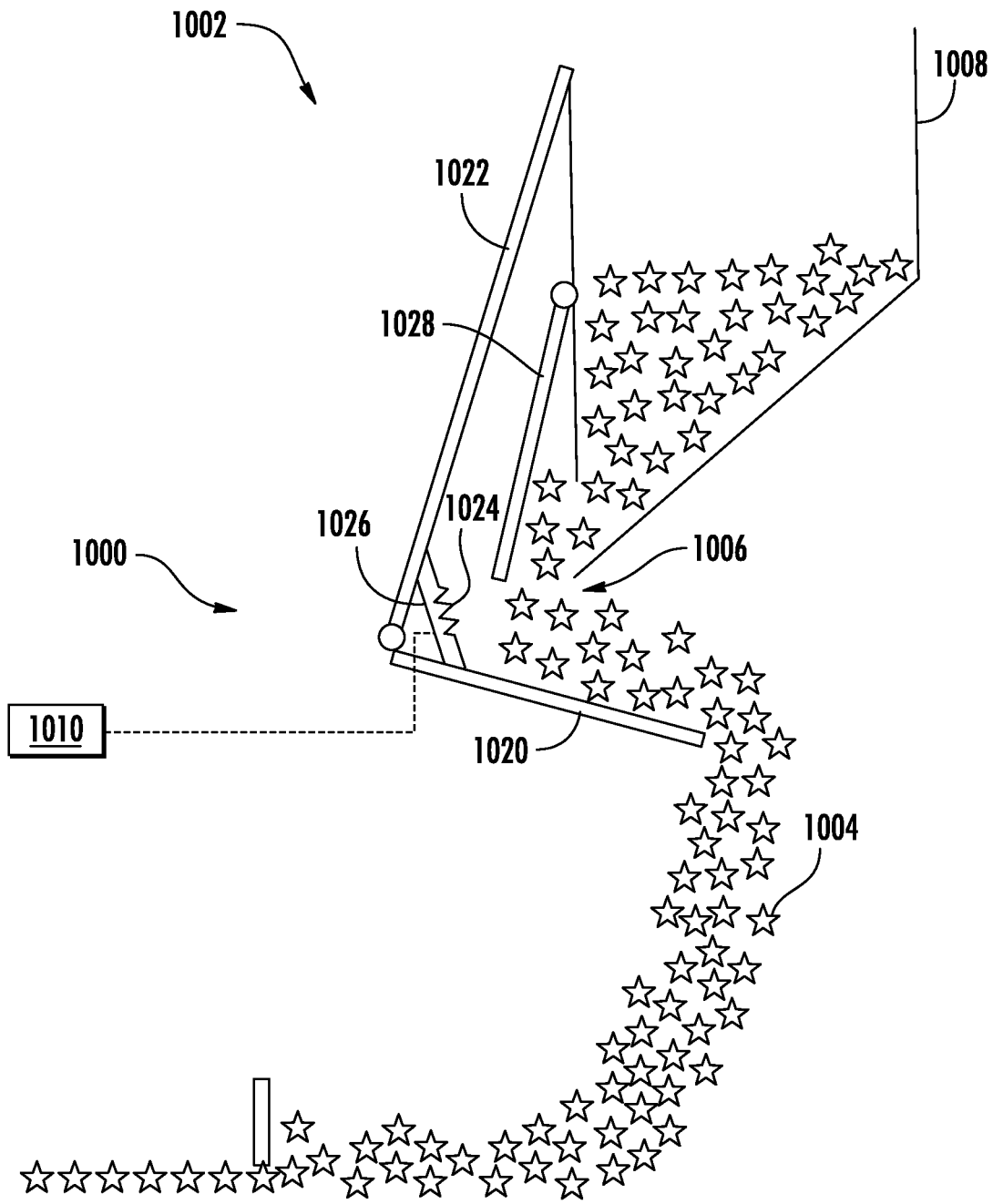
FIG. 10 is a powder flow sensor for a recoater apparatus according to an exemplary embodiment of the present subject matter.

Referring now to FIG. 10, a powder flow sensor 1000 that may be used with a recoater apparatus 1002 will be described according to an exemplary embodiment of the present subject matter. According to an exemplary embodiment, powder flow sensor 1000 may be used in conjunction with recoater apparatus 600, or any other recoater. In general, powder flow sensor 1000 may be a tactile sensor that measures the volume and/or density of powder 1004 flowing from a powder supply exit 1006 of a hopper 1008. Powder flow sensor 1000 may pass monitored output to a recoater apparatus controller 1010 for use in controlling the flow of powder 1004 from the recoater apparatus 1002. Based on the output of powder flow sensor 1000, the recoater apparatus 1002 may adjust the flow of powder 1004.

As shown, powder flow sensor 1000 includes a sensor hatch or sensor flap 1020 which is joined to a support arm 1022 by a weak spring 1024 and a strain gauge 1026. The support arm 1022 extends from hopper 1008 to position the sensor flap 1020 below a dosing gate 1028 on recoater apparatus 1000. Once dosing gate 1028 opens and powder 1004 starts to flow, the powder 1004 (being of higher mass than the spring retention force) puts pressure on sensor flap 1020 as it is pulled by gravity. Sensor flap 1020 then becomes displaced from its natural position and such displacement is picked up by strain gauge 1026 or other similar sensor to detect displacement.

The magnitude of the displacement measured by strain gauge 1026 combined with a transfer function (which is comprised of but not limited to material density (material specific), gate opening cross sectional area, hopper vibration, etc.) can provide such information as amount of powder 1004 being dosed, gate operating health, material consistency, etc. With this information a feedback to recoater apparatus 1000 or controller 1010 can be completed to change machine behavior (throttle the gate opening as needed or change recoat speed, pause machine if short feed is presumed, etc.).

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

What is claimed is:

1. An apparatus for additive manufacturing, the apparatus comprising:
    an irradiation emission directing device for generating an energy beam;
    a gas flow device with a pressurized outlet portion and a vacuum inlet portion providing laminar gas flow to a gasflow zone; and
    a recoater apparatus, comprising:
        a powder reservoir;
        a powder distribution system comprising:
            an inlet configured to receive a powder from the powder reservoir;
            an outlet associated with a gate plate having an actuator configured to move the gate plate, the outlet configured to supply onto a powder bed the powder received from the inlet;
            a dosing gate positioned at the outlet having an actuator configured to move the dosing gate between an open position and a closed position to control a quantity of the powder supplied from the outlet;
            a powder flow sensor positioned at the outlet for monitoring the quantity of the powder supplied from the outlet onto the powder bed by the dosing gate, wherein the powder flow sensor includes a strain gauge, wherein the quantity of the powder supplied by the outlet is determined at least in part by a monitored output determined by the powder flow sensor, wherein the gas flow device is connected to and moveable with the powder distribution system, wherein the powder flow sensor is further positioned between the dosing gate and the powder bed, and wherein the quantity of the powder supplied from the outlet onto the powder bed is shielded from the laminar gas flow; and
        a processor configured to perform a plurality of operations, the plurality of operations comprising:
            determining whether the monitored output satisfies a powder flow threshold;
            determining whether the monitored output is within a powder flow range upon determining the monitored output does not satisfy the powder flow threshold; and
            modifying a flow of the powder onto the powder bed from the outlet based at least in part on determining the monitored output is within the powder flow range.

2. The apparatus of claim 1, wherein the monitored output of the quantity of the powder supplied is a volume of the powder.

3. The apparatus of claim 1, wherein the plurality of operations further comprise signaling a powder distribution system failure based at least in part on a determination that the monitored output does not satisfy the powder flow threshold.

4. The apparatus of claim 1, wherein the powder distribution system further comprises:
    a powder distribution member having a plurality of openings, the plurality of openings configured for supplying the powder to the outlet; and
    a metering roller configured for supplying the powder to the powder distribution member, wherein the quantity of the powder from the metering roller is based at least in part on the monitored output determined by the powder flow sensor.

5. The apparatus of claim 1, wherein the processor is configured to modify operation of a portion of the powder distribution system based on the monitored output determined by the powder flow sensor.

6. The apparatus of claim 1, wherein the powder flow sensor is spaced from the powder bed.

7. The apparatus of claim 1, wherein the powder distribution system further comprises:
a support arm; and
a sensor flap joined to the support arm by a spring and the strain gauge,
wherein the strain gauge measures a displacement of the sensor flap,
wherein the processor is configured to determine whether the monitored output satisfies the powder flow threshold based on the displacement of the sensor flap measured by the strain gauge.

8. The apparatus of claim 1, wherein the dosing gate comprises a plurality of dosing gates, each dosing gate of the plurality of dosing gates having an associated powder flow sensor configured to monitor the flow of powder through a portion of the outlet associated with a corresponding dosing gate.

9. The apparatus of claim 8, wherein the apparatus is configured to supply the powder during the additive manufacturing of an object, wherein the apparatus is configured to supply the powder to at least a portion of the object for solidification.

10. The apparatus of claim 8, wherein each associated powder flow sensor is communicatively or electrically independent of other powder flow sensors.

11. The apparatus of claim 8, wherein each associated powder flow sensor forms a common feedback control mechanism.

12. The apparatus of claim 8, wherein the flow of the powder through some or all of the plurality of dosing gates is modifiable to maintain even powder proportions during the additive manufacturing.

13. The apparatus of claim 8, wherein powder flow sensor output from each associated powder flow sensor is passed to the processor.

14. A method for monitoring a powder flow in additive manufacturing, the method comprising:
providing, by a gas flow device, laminar gas flow to a gasflow zone;
monitoring output, via a powder flow sensor including a strain gauge, of a quantity of the powder flow from an outlet of a powder distribution system onto a build surface, the powder distribution system comprising:
an inlet configured to receive a powder from a powder reservoir;
the outlet associated with a gate plate having an actuator configured to move the gate plate, the outlet configured to supply the powder flow onto the build surface received from the inlet; and
a dosing gate positioned at the outlet positionable between an open position and a closed position to control the quantity of the powder supplied from the outlet, when the gate plate is distanced from the powder reservoir, wherein the powder flow sensor is configured to monitor the quantity of the powder supplied from the outlet onto a powder bed by the dosing gate, wherein the gas flow device is connected to and moveable with the powder distribution system, wherein the powder flow sensor is further positioned between the dosing gate and the powder bed, and wherein the quantity of the powder supplied from the outlet onto the powder bed is shielded from the laminar gas flow;
determining whether the monitored output satisfies a powder flow threshold;
determining whether the monitored output is within a powder flow range upon determining the powder flow does not satisfy the powder flow threshold; and
modifying the powder flow onto the build surface from the outlet based at least in part on determining the monitored output is within the powder flow range;
wherein an irradiation emission directing device generates an energy beam at the build surface in the gas flow zone.

15. The method of claim 14, further comprising:
generating a powder distribution system health alert upon determining the monitored output is not within the powder flow range.

16. The method of claim 14, wherein modifying the powder flow onto the build surface from the outlet based at least in part on determining the monitored output is within the powder flow range comprises:
controlling the quantity of the powder flow supplied at the outlet based at least in part on a difference between the monitored output and the powder flow threshold.

17. The method of claim 14, further comprising:
determining a total amount of a powder dispensed from the powder distribution system based at least in part on the monitored output.

* * * * *